Oct. 7, 1958 T. E. LOCKERBIE ET AL 2,854,827
APPARATUS FOR COOLING SYSTEMS UTILIZING
COOLED CIRCULATED WATER
Filed Nov. 30, 1953 3 Sheets-Sheet 1

INVENTORS
Thomas E. Lockerbie
DeForest G. Perryman
BY J. Frederic Dunckel

John P. Murphy

Oct. 7, 1958     T. E. LOCKERBIE ET AL     2,854,827
APPARATUS FOR COOLING SYSTEMS UTILIZING
COOLED CIRCULATED WATER

Filed Nov. 30, 1953     3 Sheets-Sheet 3

INVENTOR.
Thomas E. Lockerbie
BY DeForrest G. Perryman
J. Frederic Dunckel

United States Patent Office 2,854,827
Patented Oct. 7, 1958

2,854,827
APPARATUS FOR COOLING SYSTEMS UTILIZING COOLED CIRCULATED WATER

Thomas E. Lockerbie, Edmeston, De Forest G. Perryman, Albany, and John Frederic Dunckel, Herkimer, N. Y.; said Perryman and said Dunckel assignors to said Lockerbie Application November 30, 1953, Serial No. 395,184

1 Claim. (Cl. 62—307)

This invention relates to a cooling apparatus employed in the cooling of milk and other liquids, particularly in the field of dairy refrigeration where, because of the time cycle involved in the operation with respect to the need for refrigeration in milk plants, unusual problems arise.

Heretofore, milk has been pumped from a receiving vat into contact with a heat exchanger of the plate type or a surface cooler through which water is run at a 32°–34° F. temperature. Upon leaving the heat exchanger this water must, of course, be cooled again to the desired 32°–34° F. temperature. In the past this has been accomplished by recycling the water through a tank containing ammonia, Freon, or methyl chloride coils. In passing through the ice-making tank it was necessary to agitate the water so as to avoid the formation of solid ice around the coils near the outlet level of the tank. As can readily be seen, the warm water coming in will remove most of the ice formed on the ammonia or Freon coils in the lower part of the tank. However, upon reaching the level near the exit where only cold water has been flowing in contact with the coils, the rate of ice formation on the cooling coils would be greater than the removal of the ice by the warm water, with the result that a solid formation would form. This undesirable state was avoided by the agitation of the water by use of mechanical agitators or baffles.

An object of the present invention is to provide effective agitation of the water in a cooling apparatus or machine through the use of a suitable gas, such as air, which is introduced into a tank simultaneously throughout the length of the tank and transversely through the contents thereof in such a maner that no portion of the water in the tank can escape agitation.

A further object of the present invention is to eliminate the need for mechanical agitation and baffles in a cooling apparatus.

A still further object is to eliminate the need for baffles which heretofore have been necesary in order to effect the proper flow of the water over the coils for the purpose of cooling the water by melting the ice.

Another object of the present invention is to provide a cooling machine in which the gaseous agitation of the water permits even meltage of the ice throughout the tank without the use of mechanical baffles or propeller-type agitators.

An important feature of the present invention is the controlled introduction of air into the tank in such a manner so as to provide an evenly dispersed agitation throughout the entire tank so that the water flowing over the cooling coils melts the ice at an even rate at all points throughout the tank and is completely cooled to an even temperature without the excessive formation of ice at any point within the tank.

Other objects, important features, and advantages of the invention to which reference has not hereinabove specifically been made will appear hereinafter when the following description and claim are considered in connection with the accompanying drawings, in which:

Figure 1:
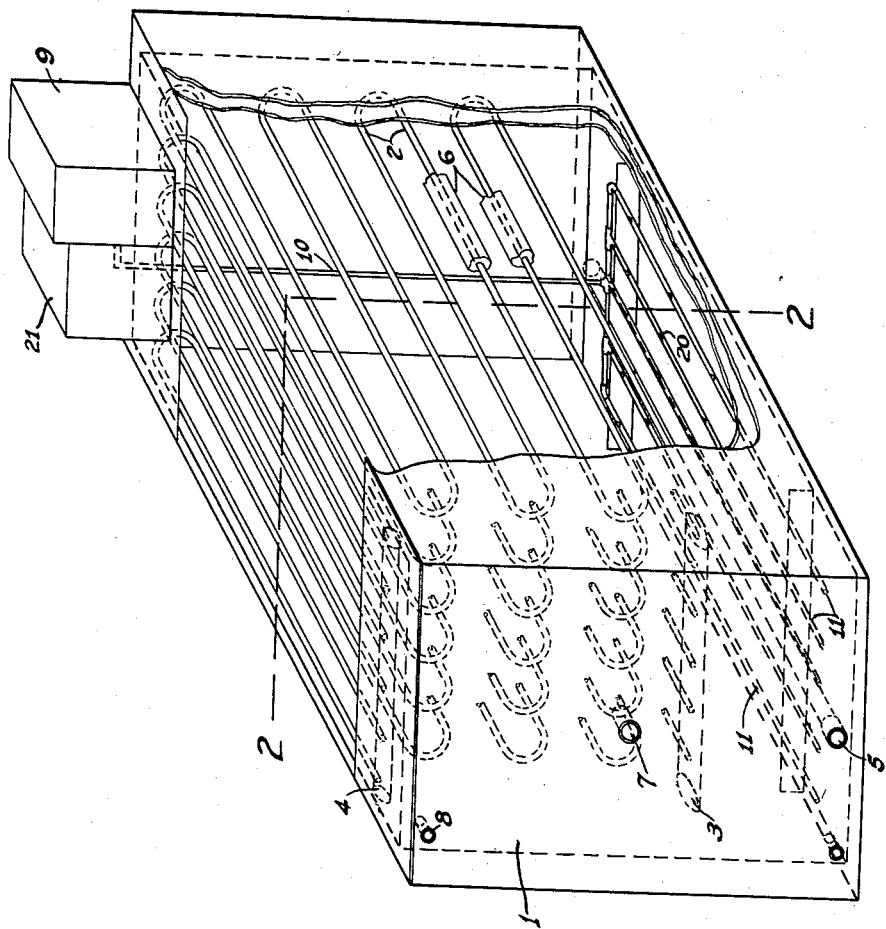
Fig. 1 is a perspective view, illustrating the arrangement of the coolant carrying pipes and the air agitator pipes.

The novel cooling machine consists of tank 1 with steel or copper coils 2 through which a refrigerant, such as ammonia, Freon, or methyl chloride, is circulated. 3 is a refrigerant liquid header through which the refrigerant enters the tank and flows through the coils 2 comprising a plurality of parallel loops disposed in parallel vertical planes. 4 is the refrigerant suction header through which the refrigerant is removed from the tank after it has performed its function of reducing the temperature while flowing through coils 2. Warm water after performing its function of cooling the milk is returned to the cooling machine through pipe 5 and circulated up through the tank, removing some of the ice 6 which has been formed around the coils during the period in which the ice has been built up on the coils. After cooling, the water is removed from the tank through pipe 7. Any overflow of the water is taken care of by tank overflow 8. During the period in which the warm returned water is brought into the tank through pipe 5 and circulated throughout the tank, air from air compressor 9 is forced down into air header 10 and air agitator pipes 11. The air is then forced out of air agitator pipes 11 and up through the tank at a controlled rate. This rate is determined with relation to the number of gallons of water in the tank, and may readily be adjusted so that any tank of a particular size may be operated at the highest efficiency. Housing 21 can be used to contain the controlling apparatus (not shown) for compressor 9.

Figure 2:
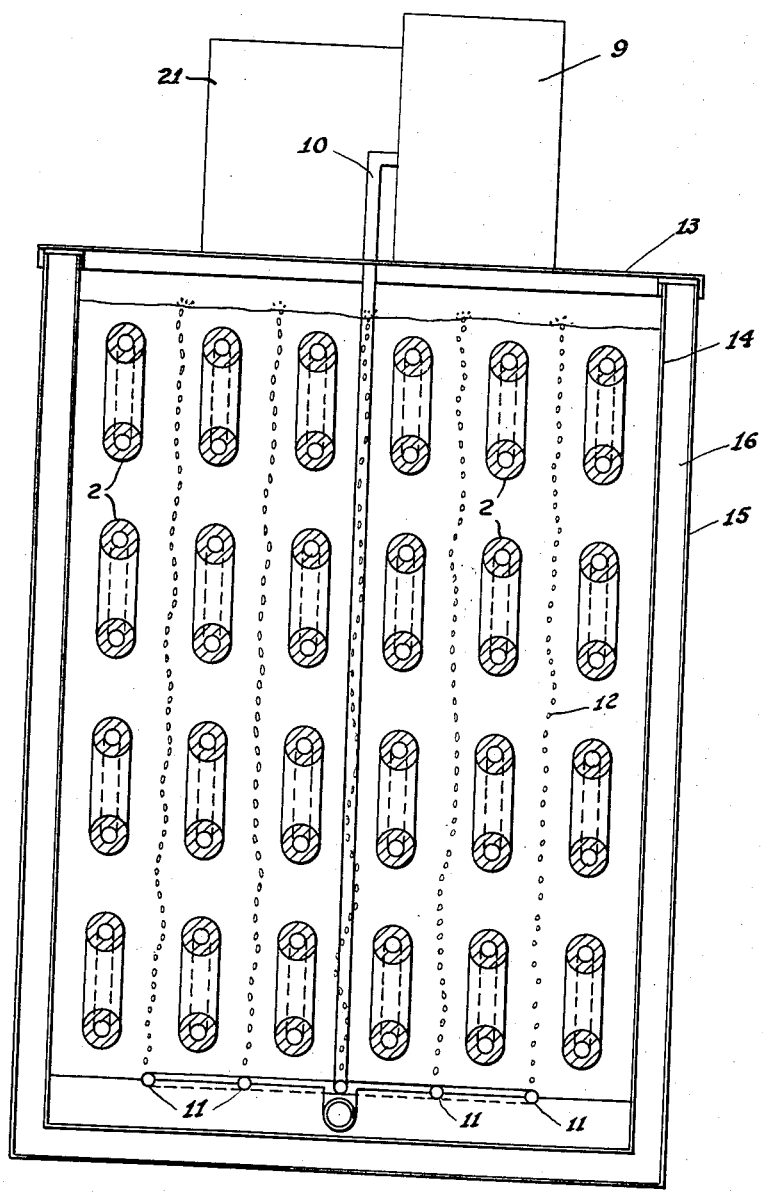
Fig. 2 is a cross-section of the cooling apparatus, looking toward the rear of the ice-making machine, taken at point 2—2 of Fig. 1.
Figure 3:
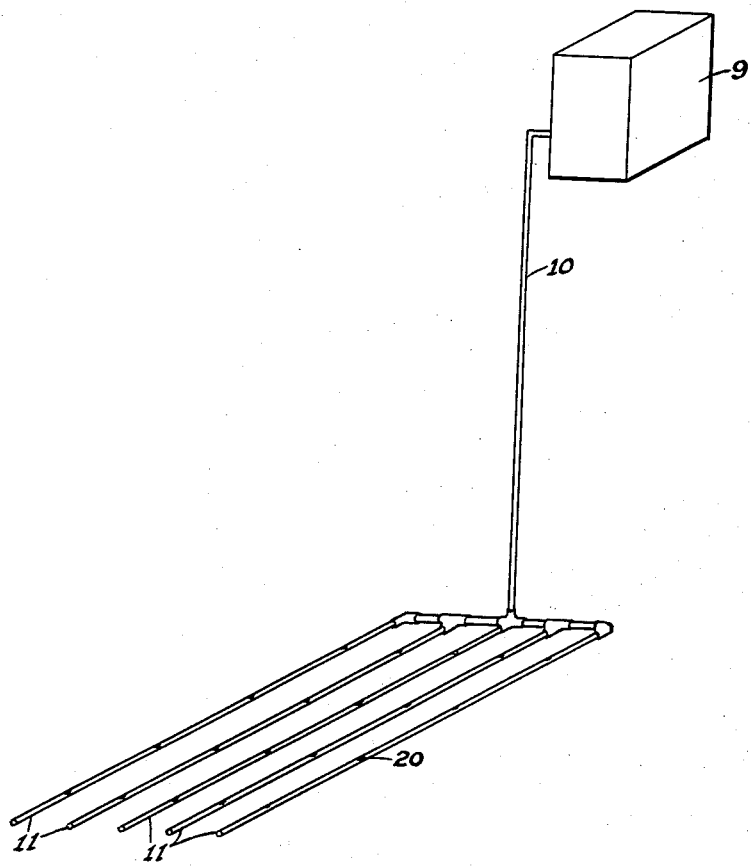
Fig. 3 is a section view of the lines, illustrating the air header and the air agitation pipes and broken sections of the air agitation pipes.

In Fig. 2 air bubbles 12 pass up through the tank. The direction of flow of the air which agitates the water around ice forming coils is shown in Fig. 2. The air from air compressor 9 passes through air header line 10 which is held in a fixed position by the mounting plate for air compressor 13.

Tank 1 comprises an inner tank 14 and an outer tank 15, having therebetween insulation 16. The air agitators of air lines or nozzles 11 have small holes drilled in their circumference for the purpose of discharging the air into the water and thus agitate the water around the ice 6 formed on coils 2. The size and number of the small holes drilled in the circumference of the air lines is of great importance, inasmuch as they determine the size and number of the air bubbles passing up through the tank at any given cross-section per unit of time. Preferably a tank having at least four air lines or nozzles 11 running from the header is employed. Each line 11 has apertures or holes 20 drilled therein for air circulation. The dimensions will obviously vary with the size of the tank and with the rate of cooling desired. A uniform size and density of bubbles is desirable to obtain the maximum efficiency with respect to the agitation of the water within the tank.

It can readily be seen that the present invention represents a substantial advance in the art of cooling water for the purpose of in turn reducing the temperature of milk on its way from the farm to the ultimate consumer. The cooling machine of the present invention supplants the old difficult-to-clean and difficult-to-maintain baffled tank with the mechanical agitator which was subject to failure as a result of improper spacing of the baffles and failure of the agitator. Not only does the present invention provide a more even rate of removal or melting of the ice with a more even reduction of the water temperature thus making available a more uniform rate of flow of cool water through the cooling plate, but it also provides a means of reducing the temperature of the water on a more economical basis with less waste due to break downs of machinery with the resultant loss of milk.

It has been found in practice that the amount of air or other gas required to effect the desired agitation of the contents of the tank such as herein shown varies somewhat according to the depth of the tank the depth of the water within the tank. It has been found, for example, that in a tank with the proportions herein shown having a capacity of 540 gallons, satisfactory agitation can be obtained by supplying about 4 cubic feet per minute of air to the distributing header at a pressure at the intake end of the conductor of perhaps 10 pounds per square inch. This usually means that compressor 9 has to supply the header leading to the air lines with an initial pressure of about 15 pounds to take care of pressure drop throughout the header and air lines.

While the present invention has been described with particular reference to cooling machine useful in dairies for the purpose of reducing the temperature of raw or pasteurized milk as it is brought to the plant, it will be obvious to those skilled in the ice-making art that such an apparatus may be applied for the purpose of supplying cold water for any other purpose.

What we claim is:

In a cooling system, an insulated tank having a lower inlet opening and upper outlet opening respectively through which circulating water enters the tank at a higher temperature than which it leaves the tank, a cooling coil uniformly disposed in said tank comprising a plurality of parallel loops disposed in parallel vertical planes, means connected to said coil for circulating a coolant therethrough for forming ice banks uniformly on said loops, and water agitating means in said tank for uniformly agitating the water as it is circulated in contact with ice formed on said loops to promote even melting of ice thereon, said agitating means comprising a plurality of uniformly disposed elongated nozzles at the bottom of the tank interposed between the parallel planes of the loops of said coil, and a source of pressurized gas operatively connected to said nozzles for percolating bubbles of pressurized gas uniformly past the coil loops as water is circulated through said tank.

References Cited in the file of this patent

UNITED STATES PATENTS

| | | |
|---|---|---|
| 965,583 | Jewell | July 26, 1910 |
| 980,152 | Haas | Dec. 27, 1910 |
| 1,046,252 | Berryman | Dec. 3, 1912 |
| 1,214,637 | Zistel | Feb. 6, 1917 |
| 1,435,643 | Kaiser | Nov. 14, 1922 |
| 1,438,902 | Cotton et al. | Dec. 12, 1922 |
| 1,985,043 | La Porte | Dec. 18, 1934 |
| 2,077,871 | Borgerd | Apr. 20, 1937 |
| 2,133,521 | Wussow et al. | Oct. 18, 1938 |